United States Patent
Hosier et al.

[11] Patent Number: 5,638,121
[45] Date of Patent: Jun. 10, 1997

[54] HIGH-SPEED OUTPUT OF VIDEO IMAGE DATA FROM AN ARRAY OF PHOTOSENSORS

[75] Inventors: Paul A. Hosier, Rochester; Jagdish C. Tandon, Fairport; Scott L. Tewinkle, Ontario; David J. Metcalfe, Marion, all of N.Y.

[73] Assignee: Xerox Corporation, Stamford, Conn.

[21] Appl. No.: 729,828

[22] Filed: Oct. 8, 1996

Related U.S. Application Data

[63] Continuation of Ser. No. 444,802, May 19, 1995, abandoned.

[51] Int. Cl.$^6$ .................................................. H04N 5/335
[52] U.S. Cl. ............................................................. 348/312
[58] Field of Search ............................... 348/207, 308, 348/312, 294, 297, 316, 315; 358/482, 483, 486; 257/215, 222, 223, 232, 234, 246; H04N 5/335

[56] References Cited

U.S. PATENT DOCUMENTS

| | | |
|---|---|---|
| 3,974,325 | 8/1976 | Wilmer . |
| 4,514,769 | 4/1985 | Gallo . |
| 4,654,713 | 3/1987 | Boucharlat et al. ............... 348/295 |
| 4,737,854 | 4/1988 | Tandon et al. ..................... 358/482 |
| 5,081,536 | 1/1992 | Tandon et al. . |
| 5,148,296 | 9/1992 | Takashima . |
| 5,528,642 | 6/1996 | Hirama ................................ 377/60 |

FOREIGN PATENT DOCUMENTS

7-59027 of 1995 Japan .

*Primary Examiner*—Andrew Faile
*Assistant Examiner*—Tuan V. Ho
*Attorney, Agent, or Firm*—R. Hutter

[57] ABSTRACT

In a photosenstive device wherein video voltage signals are output from a plurality of photosensors, the photosensors are divided into odd and even subsets. Odd photosensors output video into an odd video channel, and even photosensors output video into an even video channel. The two video signals are time-staggered from each other by one-half cycle. The signals on the odd and even video channels are then multiplexed into a single high-speed channel.

9 Claims, 6 Drawing Sheets

HIGH-SPEED OUTPUT OF VIDEO IMAGE DATA FROM AN ARRAY OF PHOTOSENSORS

This application is a continuation of application Ser. No. 08/444,802, filed May 19, 1995, now abandoned.

The present application incorporates by reference U.S. Pat. No. 5,081,536, assigned to the assignee hereof.

The present invention relates to image sensor arrays used in raster input scanners. In particular, the invention relates to photosensitive chips wherein each photosensor has its own individual transfer circuit.

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, a preferred design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to make the array out of several butted silicon chips. In one proposed design, an array is intended to be made of 20 silicon chips, butted end-to-end, each chip having 248 active photosensors spaced at 400 photosensors per inch.

Although most scanning systems currently in use are ultimately digital systems, the "raw signal" coming out of the photosensors during the scanning process is an analog video signal, with the voltage magnitude corresponding to the intensity of light impinging on the photosensor at a given time. Thus, when signals are read out from the photosensors on a chip to be converted to digital data, different video levels, corresponding, generally, to the brightness of the reflected area being scanned by a particular photosensor at a particular moment, are output as a series of analog voltage levels.

In a video-outputting chip, the total speed of output of each chip will depend on the voltage response of the output channel. Each chip outputs a sequence of voltage levels, each voltage level corresponding to a pixel in the original image. With each pixel in the original image, the voltage level must move from a signal representative of light of the previous pixel to one representative of light in the present pixel. Because of the analog nature of a video-outputting chip, the sequence of voltage outputs from one voltage level (corresponding to one pixel) to the next is a set of asymptotic curves. When the outputs of a plurality of photosensors are read out serially, certain time must be allowed between each photosensor reading to allow the reading to settle to the value of a signal corresponding to the light impinging on the photosensor. In a typical practical system for reading out the video signals, this readout time for real-time scanning is approximately 50 nanoseconds per photosensor. With each pixel signal, what is of most interest is where the analog voltage curve "ends up"—that is, the final value of the voltage signal is what is representative of the true light intensity on the photosensor. When a set of analog video signals are output over time, the portion of the output for each pixel in which the voltage level starts moving from the voltage level from the previous pixel to the voltage level of the present pixel is the settling time, which directly affects readout time.

In the prior art, U.S. Pat. No. 3,974,325 discloses a facsimile transmission device having a means for reducing bandwidth. A clock rate-halving flip-flop and an odd-even line switching flip-flop are logically combined to transmit every second data bit in each line in a vertical stagger between lines. At the receiving end, the missing bits are filled in by an interpolation device.

U.S. Pat. No. 4,514,769 discloses a video recording device in which an analog color video information signal is sampled at times determined by a first clock signal of a predetermined frequency, whose phase is reversed on every consecutive horizontal line forming the video raster. The obtained samples are digitized and encoded for recording on a magnetic record medium, with the encoded data timed relative to a second clock signal of the predetermined frequency.

U.S. Pat. No. 5,148,296 discloses an original document recording apparatus having a plurality of line sensors arranged in a linear array wherein individual chips are staggered relative to a scanning direction. Each line sensor has a built-in analog memory which stores the image and outputs the image according to a delay value, to compensate for the vertical delay time caused by the staggered position of line sensors.

According to the present invention, there is provided an apparatus for outputting image data. First and second video channels are provided. A first set of photosensors is provided, each of the first set of photosensors outputting a video signal and being selectably connectable to the first video channel. Each of a second set of photosensors outputs a video signal and is selectably connectable to the second video channel. A selector connects a selected one of the first set of photosensors to the first video channel and connect a selected one of the second set of photosensors to the second video channel. A shift register is provided, having a plurality of stages operatively arranged along a line, with each stage operatively connected to one of the photosensors. The shift register connects a new one of the first set of photosensors and a new one of the second set of photosensors with a predetermined regular period. The connection of the new one of the second set of photosensors occurs with a delay relative to the connection of the new one of the first set of photosensors.

Figure 6:
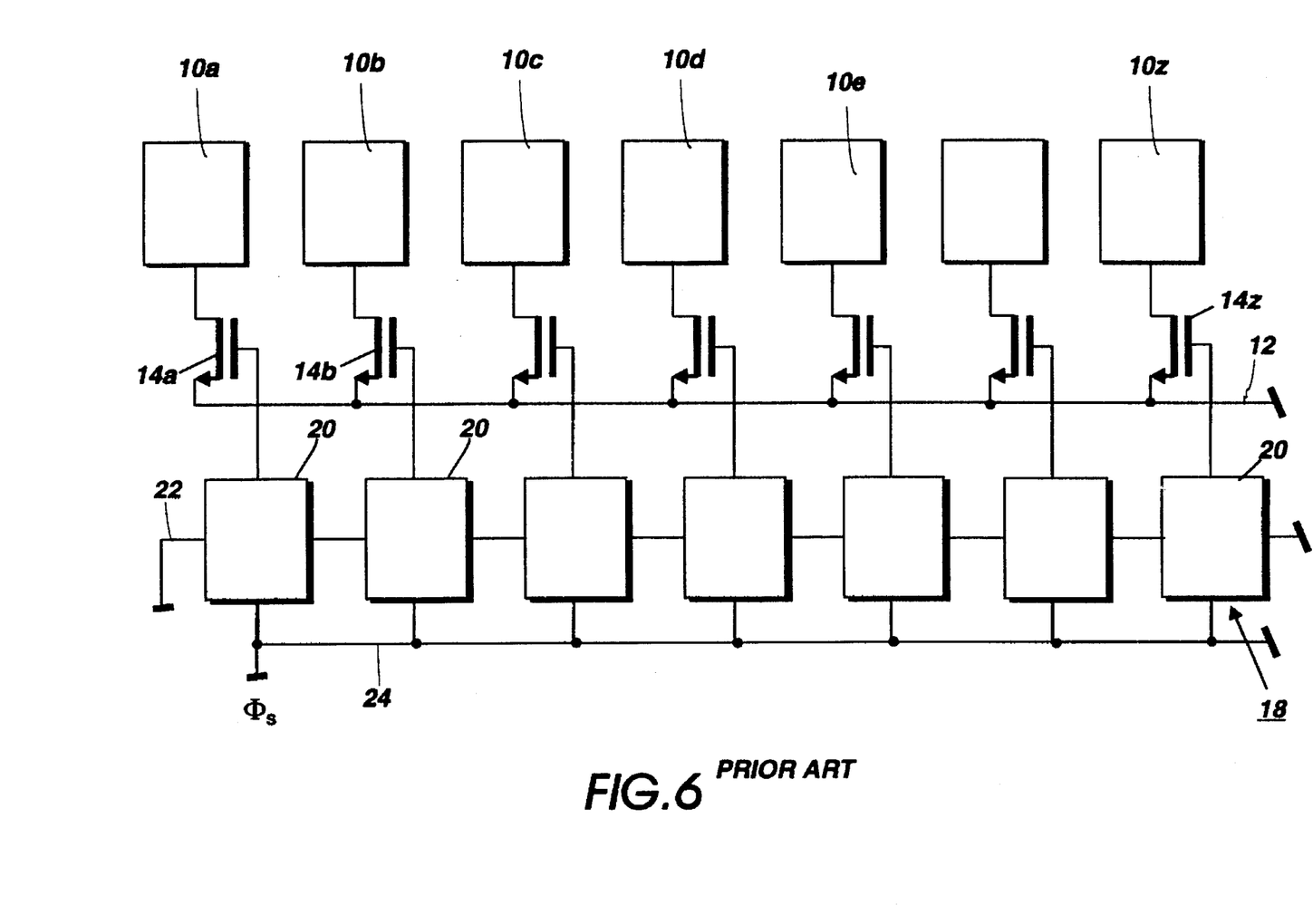
FIG. 6 shows a prior-art shift register arrangement for reading out video signals from a sequence of photosensors.

FIG. 6 is a schematic view showing a set of photosensors 10a–10z in a linear array, as would be found, for example, on a solid-state photosensitive device. The photosensors 10a–10z, in the form of photodiodes, are operatively connected to a common video line 12, onto which each photosensor 10a–10z outputs a voltage representative of the light incident thereon at a particular time. As is known in the art such as in the patent incorporated by reference, each photosensor 10a–10z may further include, in addition to a photosensitive photodiode, any number of ancillary devices, such as individual transfer circuits or amplifiers, so that, preferably, the effective output of each photosensor is a voltage, as opposed to a charge.

Each photosensor 10a–10z is connected to common video line 12 via an individual transistor switch, here shown as 14. The transistor switch 14 associated with the photosensor is independently controllable, for example, by application of a voltage to the gate of the transistor as shown in FIG. 6. Such a gate voltage closes the switch 14 so that a particular photosensor 10 may output a voltage signal onto the common video line 12 at the desired time for a coherent readout routine.

In order to read out the image signals from a sequence of photosensors 10a–10z in a manner convenient for image-processing apparatus, there is preferably associated with every transistor chip 14, a shift register 18, which comprises a set of what are known as "stages" 20. The stages 20 are arranged in series along a line 22, and are controllable via a pixel clock line 24.

According to a familiar method of operation of a shift register such as 18, each stage 20 along line 22 is capable of activating a particular transistor switch 14 associated with one photosensor 10a–10z. Ordinarily, each stage 20 "holds" a logical digital 0, unless and until there is entered into the particular stage 20 a digital 1, which is typically a one-cycle voltage pulse, along line 22. The single digital 1 is propagated along line 22, from one stage 20 to the next. When the 1 activates a particular stage 20, the associated transistor switch 14 is caused to make a connection between the associated photosensor 10 and the common video line 12. In this way, the photosensors 10a–10z are activated in a coherent sequence.

Figure 7:
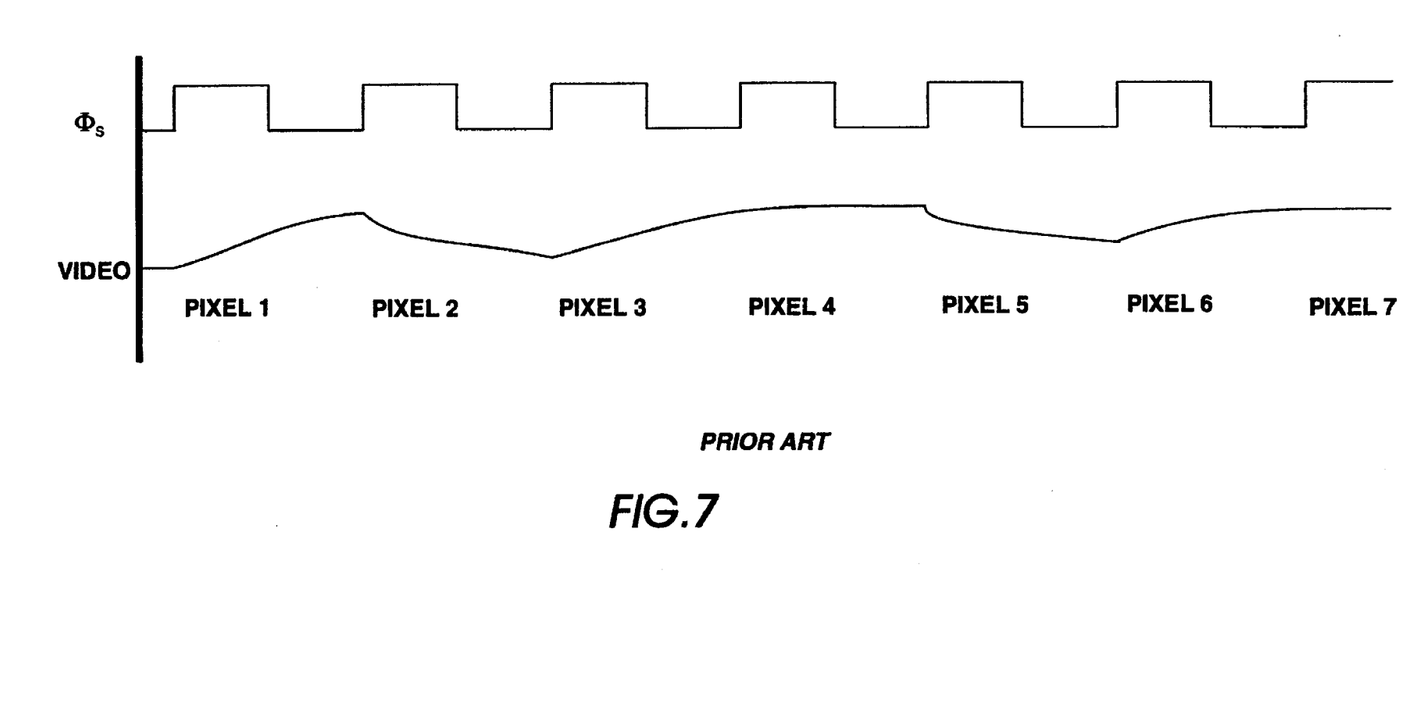
FIG. 7 is an example video output from the apparatus of FIG. 6.

Operating the iteration of the digital 1 along line 22 is a pixel clock, in the form of a square wave of predetermined frequency apparent on line 24. This pixel clock signal $\Phi_s$ activates one stage 20 along line 22 with every on-and-off cycle thereof. FIG. 7 shows comparative waveforms of pixel clock signal $\Phi_s$ in comparison with a resulting video signal from a sequence of photosensors. As can be seen, with each on-and-off cycle of $\Phi_s$, the video signal rises or lowers from one voltage level to another; the asymptotic value of the video voltage signal for each pixel represents the true indication of light incident on the particular photosensor. With each cycle of $\Phi_s$, a new photosensor is activated, and the video signal abruptly changes direction (as shown by the discontinuities in the video signal line) and starts moving toward a new value representative of the light incident on the new photosensor. It will be noted that the early part of each new pixel signal, generally corresponding to the on portion of the on-and-off cycle of $\Phi_s$, is of relatively little importance in determining the true intensity of light incident on a particular photosensor, and instead represents the analog signal adjusting from one pixel intensity to another.

Figure 1:
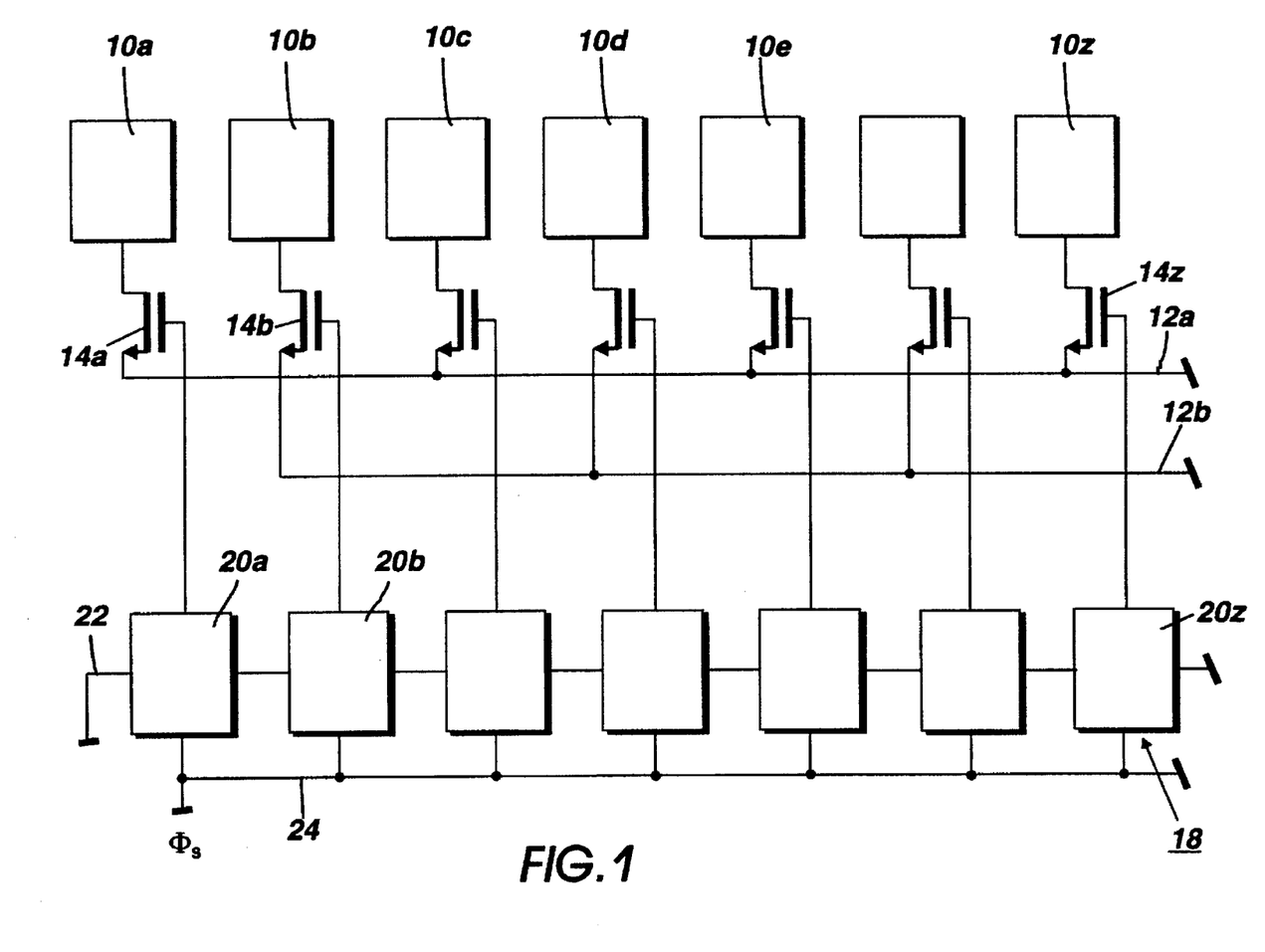
FIG. 1 is a simplified schematic showing an arrangement of circuit elements for the readout system of the present invention.

FIG. 1 is a schematic view showing the basic elements of a readout system according to the present invention. As in the above description, there is provided a set of photosensors 10a–10z, which are connected by transistor switches 14a, 14b, etc. which in turn are activated by shift register 18 which includes a set of half-stages 20a, 20b, etc., which are arranged along a single line 22, and also activated by a pixel clock line 24.

According to the present invention, the linear array of photosensors 10a . . . 10z are arranged in an interleaved manner with odd and even subsets, with the odd subsets of photosensors such as 10a and 10c connected to an odd video line 12a, and the even photosensors such as 10b and 10d, connected to an even video line 12b. Video line 12a receives the video outputs only of the odd photosensors, and the even video line 12b receives the video outputs only of the even photosensors. Because both the odd and even photosensors are controlled by a single shift register 18, having half-stages 20a, 20b, etc., the parallel video signals on odd video line 12a and even video line 12b can be output in parallel; further the odd and even video signals can be arranged to be staggered over time.

Figure 2:
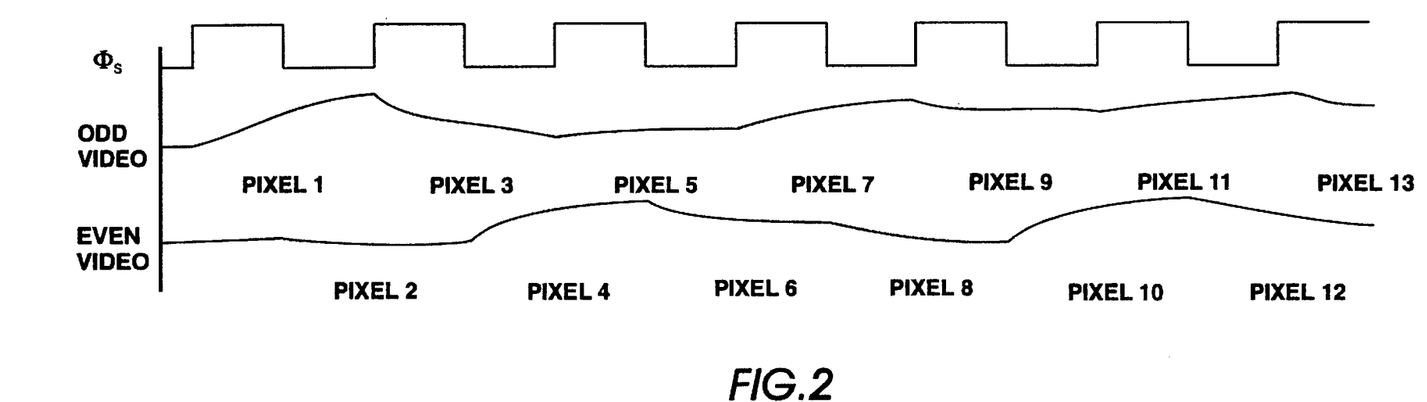
FIG. 2 is a set of comparative waveforms showing the behavior of analog signals on odd and even video lines, in the system of the present invention.

FIG. 2 shows a set of comparative waveforms for example video voltage signals on odd video line 12a and even video line 12b, in comparison with a standard pixel clock signal $\Phi_s$. According to the preferred operation of shift register 18 in the apparatus of FIG. 1, a digital 1 is moved along line 22 through successive half-stages 20a, 20b, etc. on shift register 18 in such a manner that, for example, the switch 14b for photosensor 10b (corresponding to pixel 2), will be activated at a point in time exactly half way through the video readout of photosensor 10a (pixel 1) on odd video line 12a. This time-staggering, when the next pixel in a sequence is read out during the middle of the readout of a previous photosensor, is apparent from the configuration of the half-stages 20a, 20b, etc. of shift register 18 in relation to the odd and even photosensors 10a–10z.

(In the art of shift registers, a "stage" is defined as a portion of a shift register that is altered with a single clock pulse, so each odd and even pair of half-stages such as 20a and 20b form a single stage according to the strict definition. Thus, in the specification and claims herein, each portion of the shift register controlling one transistor 14a, 14b, . . . shall be defined as a "half-stage," because two staggered outputs result on transistors 14a and 14b with each single clock pulse.)

One practical advantage of this arrangement is that the video voltage signals from a set of odd and even pixels can together be read out onto the odd and even video lines at a considerably faster rate than in a situation where all of the photosensors are reading out to a single video line. Another practical advantage is that, because fewer transistors are connected to each of the odd and even lines, there is less capacitance on each line than if both odd and even signal trains were read out on one line; because there is less capacitance on the line, the settling time for the video signal is decreased, and each video signal can settle to its true asympototic value faster.

Figure 3:
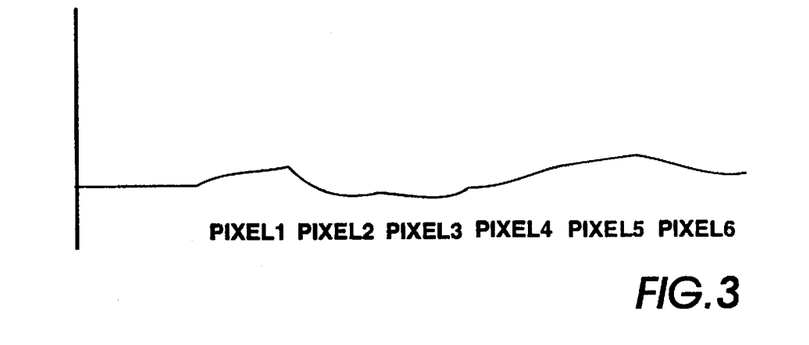
FIG. 3 shows an example waveform of a multiplexed combination of the odd and even video lines shown in FIG. 2.

According to a preferred embodiment of the present invention, the different video signal trains on the odd and even video lines are eventually multiplexed onto a single line. An example of such a multiplexed signal, representing a multiplexing of the example signal trains in FIG. 2, is shown as FIG. 3. Comparing FIG. 2 and FIG. 3, it can be seen that the signal train of FIG. 3 represents only the latter, or "terminal," portion of each video signal corresponding to each pixel. For example, only the second half of the behavior of pixel 1 on the odd video line is apparent in the signal train of FIG. 3; after the pixel 1 signal is over, the multiplexed signal train "picks up" with the terminal portion of the pixel 2 video signal, and so forth. Only the terminal portions, or second halves, of each voltage signal in the odd and even video lines, respectively, are apparent in the signal train of FIG. 3. In this way, the beginning portion of each voltage signal, in which the voltage signal abruptly moves from the voltage signal corresponding to one pixel to the voltage signal corresponding to the next, is removed from the final output, ultimately saving time in the readout of the entire photosensor set.

Figure 4A:
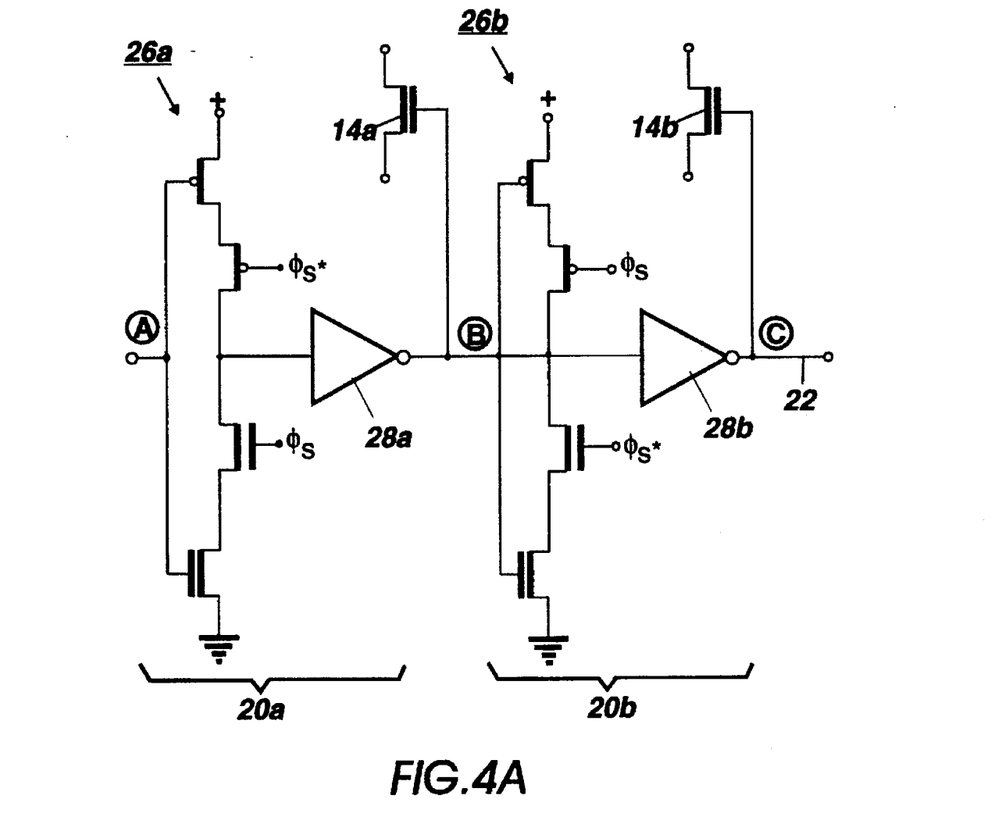
FIG. 4A is a schematic view of a preferred embodiment of a half-stage shift register according to the present invention.

FIG. 4A is a schematic diagram showing two representative half-stages, 20a and 20b, along line 22, forming a portion of a shift register 18. According to a preferred embodiment of the present invention, each half-stage 20a, 20b, . . . includes a gated inverter 26a, 26b followed by a simple inverter 28a, 28b. Each gated inverter 26 is connected to a voltage supply and includes, as illustrated, p-channel devices (closed when the gate is low) in the upper portion and and n-channel devices (closed when the gate is high) in the lower portion, which are responsive to regular (noninverted) and inverted clock signals. Significantly, the gated inverters 26a and 26b are physically identical, except that gated inverter 26a is operatively connected to inverted and non-inverted clock pulses where gated inverter 26b is operatively connected to oppositely-inverted clock pulses.

Figure 4B:
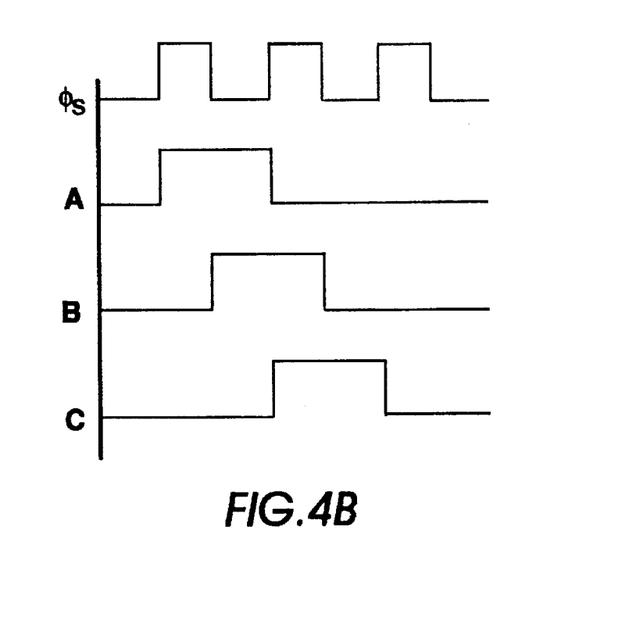
FIG. 4B is a set of comparative waveforms illustrating control signals applied to various switches within the circuit of FIG. 4A.

FIG. 4B shows a set of comparative waveforms illustrating the operation of the two half-stages of shift register 18, in response to a pixel clock signal $\Phi_s$, showing the behavior of signals at points marked A, B, and C in the schematic of FIG. 4A. Comparing FIG. 4A to FIG. 1, instead of the single pixel clock line 24 shown in FIG. 1, each individual half-stage of the preferred embodiment accepts, as shown in FIG. 4A, both the direct pixel clock signal $\Phi_s$ and an inverted clock signal, here shown as $\Phi_s^*$.

It can be seen in FIG. 4A that each half-stage such as 20a, 20b, etc., outputs to a single transistor switch 14a, 14b, etc., which, as shown in FIG. 1, causes the associated photosensor to be connected to one or another video line. Alternating half-stages 20a, 20b, etc., along line 22 are physically identical, except that alternating half-stages are operatively connected to receive inverted versions of the clock signal $\Phi_s$: comparing half-stage 20a with 20b, it can be seen that where the gated inverter 26a of half-stage 20a accepts $\Phi_s$, gated inverter 26b of half-stage 20b is connected to receive the inverted clock signal $\Phi_s^*$, and vice-versa. This alternating configuration of half-stages along line 22 of shift register 18 is apparent along the entire length of the shift register 18.

Turning to the comparative waveforms of FIG. 4B, the various half-stages of shift register 18 respond in different ways to the on-and-off changes in the basic clock signal $\Phi_s$. As can be seen, because of the opposite connections of $\Phi_s$ and $\Phi_s^*$ in alternate half-stages such as 20a and 20b, an odd half-stage such as 20a will be activated in response to $\Phi_s$ going high, while an even half-stage such as 20b will be activated in response to $\Phi_s$ going low. This alternation of responses to $\Phi_s$ with odd and even half-stages along line 22 of shift register 18 enables the half-cycle time staggering operation which creates the desirable half-cycle time lag between odd and even video lines, such as shown in FIG. 2.

Figure 5:
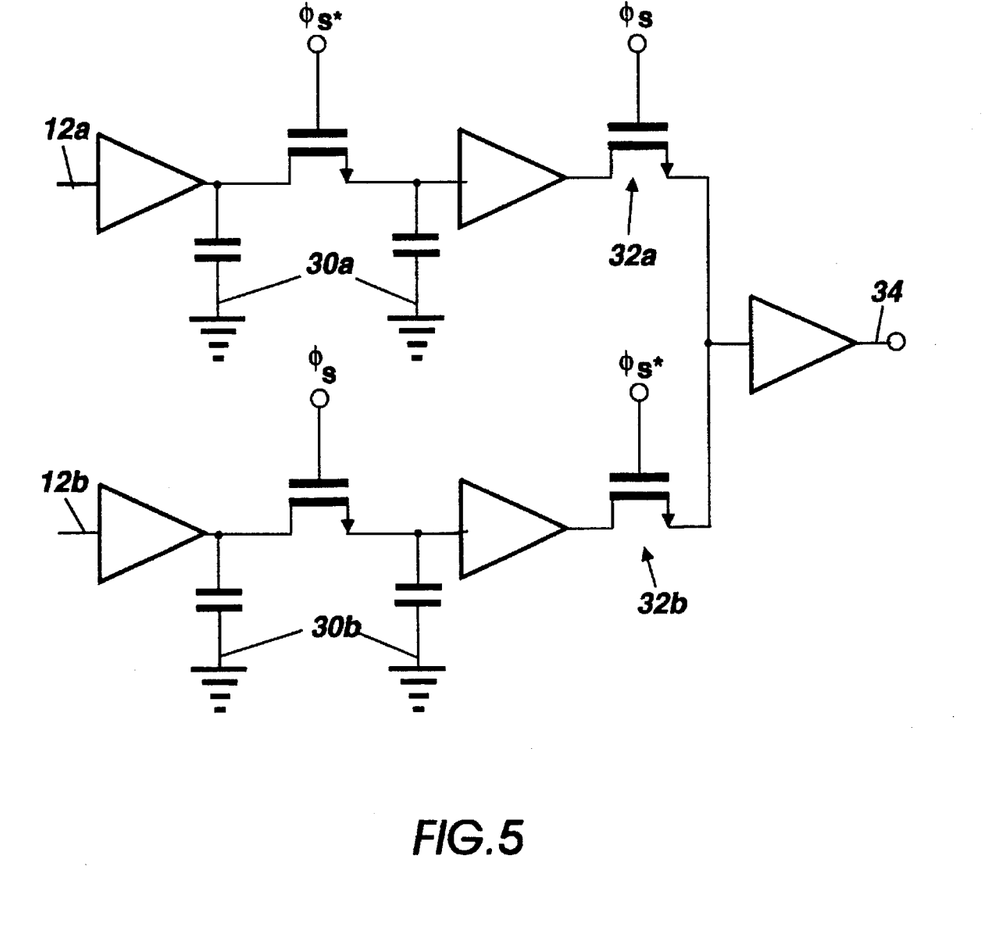
FIG. 5 is a schematic showing an example of a multiplexer for use in conjunction with the system of the present invention.

The time-staggered alternating behavior of the odd and even half-stages in shift register 18 creates time-staggered pulse trains on the odd and even video lines 12a and 12b. In order to obtain the desired multiplexed, high-speed single signal train as shown in FIG. 3, the odd and even video lines must be re-multiplexed into a single line. FIG. 5 is a schematic showing how odd video line 12a and even 12b can be multiplexed by the application of the basic clock signal $\Phi_s$ and its inverse $\Phi_s^*$ to the multiplexing circuit, to obtain the single signal train. Each line 12a and 12b includes, in addition to the unity-gain amplifiers shown, a parallel pair of capacitors, shown as 30a and 30b respectively, which hold the signal as a charge temporarily until the operation of the various transistor switches such as 32a and 32b cause the stored signals to pass through the unity-gain amplifiers at a time suitable for a multiplexing routine. As can be seen in FIG. 5, transistor switch 32a is responsive to $\Phi_s$ at locations where transistor switch 32b is responsive to the inverse $\Phi_s^*$. The multiplex signal is then output through another amplifier on line 34. The analog video signal on line 34 can then be processed any known means for use elsewhere in a scanning system, and is typically converted into a digital signal for use in digital image-processing apparatus.

It will also be noted in FIG. 3 that there is some settling effect with each new pixel signal on the multiplexed line; that is, the changes in signal with each new pixel are not perfectly discontinuous. Nonetheless, the video signals on the multiplexed line arrive at their asymptotic true values at a relatively high speed.

Although the illustrated embodiment of the present invention shows the photosensors 10a–10z on a particular photosensitive chip divided into odd and even groups, it is conceivable that other applications of the claimed invention can exist as well. For example, instead of dividing the photosensors into two groups, outputting video into two video lines, there could be provided three sets of photosensors, which alternately output signals into three video channels. Such a three-channel system may be useful, for example, where each channel is dedicated to a particular primary color in an original image. Indeed, four or more video channels, each video channel responding to a particular subset of photosensors, could be provided for an extremely high-speed system.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. An apparatus for outputting image data, comprising:

a first video channel;

a second video channel;

a first set of photosensors, each of the first set of photosensors outputting a video signal and being selectably connectable to the first video channel;

a second set of photosensors, each of the second set of photosensors outputting a video signal and being selectably connectable to the second video channel; and a shift register having a plurality of half-stages operatively arranged along a line, each half-stage being operatively connected to one of the photosensors, the shift register adapted to connect a new one of the first set of photosensors and a new one of the second set of photosensors with a predetermined regular period, the connection of the new one of the second set of photosensors occurring with a delay relative to the connection of the new one of the first set of photosensors.

2. The apparatus of claim 1, the first set of photosensors being interleaved with the second set of photosensors in a linear array.

3. The apparatus of claim 1, the shift register including odd half-stages alternating with even half-stages along the line, the odd half-stages being operatively connected to one of the first set of photosensors and the even half-stages being operatively connected to one of the second set of photosensors.

4. The apparatus of claim 3, wherein the odd half-stages are physically identical to the even half-stages, the even half-stages being operatively connected to an inverted clock pulse where the odd half-stages are operatively connected to a non-inverted clock pulse.

5. The apparatus of claim 1, each photosensor adapted to output a video signal comprising a voltage tending to a final magnitude representative of an intensity of light impinging thereon.

6. The apparatus of claim 1, further comprising a multiplexer adapted to combine signals from the first video channel and the second video channel, thereby outputting a combined signal.

7. The apparatus of claim 6, wherein the multiplexer outputs a combined signal representative of terminal portions of video signals output by each photosensor.

8. The apparatus of claim 1, each of the first set of photosensors and each of the second set of photosensors including a transfer circuit associated therewith.

9. An apparatus for outputting image data, comprising:

a first video channel;

a second video channel;

a first set of photosensors, each of the first set of photosensors outputting a video signal and being selectably connectable to the first video channel;

a second set of photosensors, interleaved with the first set of photosensors in a linear array, each of the second set of photosensors outputting a video signal and being selectably connectable to the second video channel;

a shift register having a plurality of half-stages operatively arranged along a line, each half-stage being operatively connected to one of the photosensors, the shift register adapted to connect a new one of the first set of photosensors and a new one of the second set of photosensors in response to a clock signal, the connection of the new one of the second set of photosensors occurring with a delay relative to the connection of the new one of the first set of photosensors;

the odd half-stages of the shift register being physically identical to the even half-stages of the shift register, the even half-stages being operatively connected to an inverted clock pulse where the odd half-stages are operatively connected to a non-inverted clock pulse; and a multiplexer adapted to combine signals from the first video channel and the second video channel, and outputting a combined signal representative of terminal portions of video signals output by each photosensor.

* * * * *